United States Patent
Johnson et al.

(10) Patent No.: US 6,625,135 B1
(45) Date of Patent: Sep. 23, 2003

(54) METHOD AND APPARATUS FOR INCORPORATING ENVIRONMENTAL INFORMATION FOR MOBILE COMMUNICATIONS

(75) Inventors: David B. Johnson, Pittsburgh, PA (US); Bernard J. Bennington, Pittsburgh, PA (US); Daniel D. Stancil, Pittsburgh, PA (US)

(73) Assignee: Cargenie Mellon University, Pittsburgh, PA (US)

(*) Notice: Subject to any disclaimer, the term of this patent is extended or adjusted under 35 U.S.C. 154(b) by 0 days.

(21) Appl. No.: 09/300,871

(22) Filed: Apr. 28, 1999

Related U.S. Application Data
(60) Provisional application No. 60/085,055, filed on May 11, 1998.

(51) Int. Cl.[7] .................................................. H04Q 7/00
(52) U.S. Cl. ...................... 370/332; 455/67.3; 455/115; 455/226.2; 455/439; 455/440; 455/456
(58) Field of Search .................. 370/338, 299, 370/332, 395.5, 395.52, 400, 310.2, 328, 331; 455/439, 440, 441, 445, 456, 63, 67.1, 67.3, 67.4, 115, 136, 226.2, 33.1, 54.1

(56) References Cited

U.S. PATENT DOCUMENTS

| | | | |
|---|---|---|---|
| 5,257,405 A | * 10/1993 | Reitberger ................. 455/54.1 |
| 5,493,694 A | 2/1996 | Vicek et al. ............... 455/53.1 |
| 5,561,841 A | * 10/1996 | Markus ..................... 455/33.1 |
| 5,561,851 A | 10/1996 | Hubbell et al. ............. 455/54.1 |
| 5,646,844 A | 7/1997 | Gudat et al. ............. 364/449.2 |
| 5,657,317 A | * 8/1997 | Mahany et al. ............. 370/338 |
| 5,668,880 A | 9/1997 | Alajajian .................... 380/49 |
| 5,669,061 A | 9/1997 | Schipper .................... 455/429 |
| 5,678,182 A | 10/1997 | Miller et al. .............. 455/33.1 |
| 5,884,147 A | * 3/1999 | Reudink et al. ............. 455/67.1 |
| 6,208,295 B1 | * 3/2001 | Dogan et al. ............... 342/378 |
| 6,252,544 B1 | * 6/2001 | Hoffberg .................. 342/357.1 |

FOREIGN PATENT DOCUMENTS

SE WO 96/13951 9/1996

OTHER PUBLICATIONS

Tameh, E.K. and Nix, A.R. "An Integrated Deterministic Urban/Rural Propagation Model". Antennas and Propagation for Future Mobile Communications, Feb. 23, 1998, pp. 5/1–5/7, London, UK.*

Thomas, P.A. and Nabritt, S.M. "Propagation Models Used in Wireless Communications System Design". Southeasteon '98, Apr. 24–26, 1998, pp. 230–233, Orlando, FL.*

Jan, Shiun–Chi and Jeng, Shyh–kang "A Novel Propagation Modeling for Microcellular Communications in Urban Environments". IEEE Transactions on Vehicular Technology, vol. 46, No. 4, Nov. 1997, pp. 1021–1026.*

Martin Junius, ""Intelligent" Radio resource Management Pattern Recognition with GSM Radio Measurement Date and Application" (with translation) (1993).

* cited by examiner

Primary Examiner—Hassan Kizou
Assistant Examiner—Anh-Vu H Ly
(74) Attorney, Agent, or Firm—Blackwell Sanders Peper Martin LLP

(57) ABSTRACT

An apparatus and method for communicating between a first communication node and a second communication node in an area having a plurality of communication nodes is disclosed which comprises generating a propagation model of signals from selected communication nodes in the area. The communication nodes may be fixed or mobile. The propagation model is based on an environmental map that includes the topography of the terrain and structures in the area. The propagation model is generated at selected intervals to provide updated information for predicting the quality of communication at a location at a future time.

26 Claims, 9 Drawing Sheets

METHOD AND APPARATUS FOR INCORPORATING ENVIRONMENTAL INFORMATION FOR MOBILE COMMUNICATIONS

This application claims the benefit of provisional application No. 60/085,055, filed May 11, 1998.

TECHNICAL FIELD

The present invention relates generally to a method and apparatus for predicting loss of signal quality in a mobile communications system and, more particularly, to a method and apparatus for predicting loss of signal quality in response to knowledge of the environment in which the mobile communications system is used and also to adapting the routing, network selection, or other behavior in response to the prediction to improve the signal quality.

BACKGROUND

As mobile machines capable of operating manually, partially or fully autonomously at work sites are developed, a large amount of up-to-date information is required to coordinate particular tasks and to provide adequate time for the machines to plan their movements. In some situations, multiple pieces of equipment must work cooperatively with one another and information regarding the activity and movement of each machine and other objects in the environment must be communicated. As the work site becomes more complex and more machines are used, an efficient means for receiving and transmitting data among the machines is required. Further, the information that must be communicated is diverse in nature. For example, the system must support prioritized data, giving precedence to data pertaining to mission-critical operations. Some of the operations may be highly interactive, requiring very low system latencies. There is also large variation in bandwidth requirements, from a few bytes per second to hundreds of thousands of bytes per second or more.

Currently, wireless mobile communications systems are configured to switch between routes or networks in response to detection of loss of signal quality. For example, cellular systems switch base stations when the signal level drops below a specified level, such as when a mobile node moves from one base station area to another. In some cases the drop in signal level occurs sufficiently fast that the connection is lost before hand off to another base station can be completed. For example, a communication system for heavy mobile machinery that is operating partially or fully autonomously cannot afford to lose valuable data during this fade out period; quality communications must be maintained at all times. It is ad therefore desirable to have a mobile communication system with means for preventing degradation of communication signals and loss of information. In order to make most efficient use of the bandwidth available, the communication system would ideally have the capability to choose among several overlapping wireless networks for the networks most suited for a particular application. To prevent loss of communication signals, it is also desired to switch base stations or networks immediately before the mobile node moves from one network to another. This requires the ability to predict handoffs before they are forced and inform the network when it is discovered that a handoff is imminent. The ability to predict handoffs must be reliable in a work environment having a large amount of interference due to complex terrain including hills, trenches, pits, and tunnels, and where the machinery is spread over large distances. Radio frequency (RF) wave propagation in regions having irregular terrain and buildings, such as deep trenches, steep hills, and high walls, require factors such as the reflection, diffraction, multi-path, and scattering effects to be taken into account. The signal strength of the RF signals can fluctuate greatly with small movements in such regions. The reliability of the system must be balanced with speed, since a wireless network can typically be made more reliable by adding error checking and correction, at the expense of lower throughput and higher latency.

In traditional hierarchical data networks, such as the Internet, routing protocols are tied to the logical location of the nodes in the network. When a packet is transmitted, it contains the address of the destination host computer in its header. Intermediate nodes that exist in the path between the source and destination examine the address of the destination and make decisions about how to route the packet based upon the network component of this destination address. This allows the intermediate nodes to forward the packet to the network on which the destination host resides without knowing the exact location of the destination host. As the packet travels along the path, the intermediate nodes that are closer to the destination have information about the exact location of the destination and forward the packet accordingly. One advantage of this type of scheme is that a host only needs to know the location of a few networks of nodes instead of the location of every node in the network.

This traditional network assumes that hosts will be stationary. With lightweight and battery powered mobile computers using wireless technology, users may move around while maintaining connectivity. When nodes move away from their "home" network, however, the scheme breaks down. For example, when a mobile computer with an address that belongs to network A moves to network B, the packets that are destined for the mobile computer will still be delivered to network A, as indicated by the network component of the address. All packets that were destined to the mobile computer will be lost while the mobile computer is away from its home network. The limitations of the traditional routing scheme restrict the mobility of these computers by confining them to a single network.

Accordingly, the present invention is directed to overcoming one or more of the problems as set forth above.

DISCLOSURE OF THE INVENTION

In one embodiment of the present invention, a method for communicating between a first communication node and a second communication node in an area having a plurality of communication nodes includes generating a propagation model of signals from selected communication nodes in the area. The communication nodes may be fixed or mobile. The propagation model is based on an environmental map that includes the topography of terrain and structures in the area. The propagation model is generated at selected intervals to provide updated information for predicting the quality of communication at a location at a future time. Additionally, the present invention predicts the future location of a mobile communication node based on the speed and direction of travel of the mobile communication nodes. The previous quality of communication at the predicted location of a communication node is also used. The communication signals are then routed through the network in a manner that provides the desired or best available predicted quality of communication.

BEST MODE FOR CARRYING OUT THE INVENTION

Overview

Figure 1:
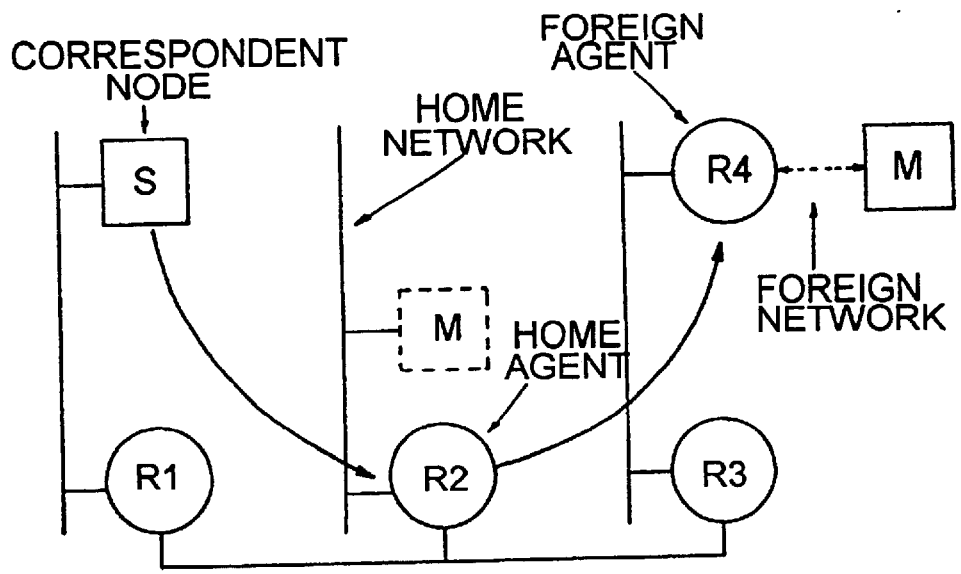
FIG. 1 is a functional block diagram showing a basic Mobile IP configuration.

The present wireless mobile communication system provides a method and apparatus for communicating between two or more communication nodes in an area having a plurality of communication nodes and one or more communication network technologies. The communication nodes may be mobile or stationary. An intelligent switching system incorporates position information and calculations of RF wave propagation for selected communication networks. At selected time intervals, an environmental map which includes the topography of terrain and structures in the area, as well as the locations and properties of potential sources of electromagnetic interference, is used to create a RF propagation and communications model for signals generated by selected communication nodes and networks in the area. The RF propagation and communications model offers the predicted signal quality at any given location. With these inputs, each communication node in the present network can predict where it will be in the future, whether that location will be reachable via a particular wireless network, and the quality of the signal at that location. The network can then prepare to handoff between base stations or networks having the desired signal quality, thus minimizing the delay and the overhead incurred. In order to support mobile nodes, a communication protocol, such as the standard Internet protocol known as Mobile IP, is used which allows nodes to change their location in the network without changing their address. When a mobile node moves from one network to another, the home agent is the only node in the network which keeps track of the location of the mobile node and routes packets to this location. The present system also allows direct peer-to-peer communication. When two nodes are within the range of each other's wireless coverage, they can communicate directly without the aid of any central router. When two nodes are beyond the range of each other's wireless coverage, they may be able to communicate by using other mobile nodes between them to forward their packets, thus dynamically using these intermediate nodes as routers and forming an ad hoc network. By providing this capability, the present system is able to support a large number of mobile nodes. The present system further provides support for a variety of network traffic types, including data-intensive file transfers, time-critical emergency data, real time audio data, constant bandwidth data, and periodic position data. The type of service required for the traffic is also considered to meet the special needs of various communication nodes and facilitating the interaction of different user applications.

Mobile IP

The Mobile IP (Internet Protocol) standard was developed to provide for the mobility of hosts on the Internet. The implementation of Mobile IP, as discussed herein, is based on the IP version 4 (IPv4) protocol standard. Mobile IPv4 allows for the transparent routing of IPv4 packets to mobile nodes in the Internet. There is also a newer version of IP which is known as IP version 6 (IPv6) for which there is also a Mobile IP extension which is known as Mobile IPv6. Both Mobile IPv4 and Mobile IPv6 may be used in the present apparatus.

In traditional IP routing, if a node has moved to another network, packets destined for it will no longer be deliverable. For a node to be able to communicate on a new network, it must change its IP address. This makes it impossible to maintain connections when the node changes locations. Mobile IP is a routing scheme that does not require a mobile node to change its IP address when it moves. Instead, each mobile node is identified by a single IP address, regardless of its current point of attachment to the network.

An Understanding of Mobile IP Requires Familiarity with the Following Concepts:

Mobile node: A node that moves from one network to another. The mobile node implements Mobile IP in order to maintain communication with other nodes.

Correspondent node: A node with which a mobile node is communicating. A correspondent node could be either a stationary node or another mobile node.

Home address: The IP address that is assigned to the mobile node and which remains unchanged, regardless of whether the node is attached to the network.

Home network: Each mobile node has a home network. This is the network to which traditional IP routing would deliver packets addressed with its home address when a mobile node is attached to its home network. Traditional IP routing could deliver packets to the mobile node using its home address.

Foreign network: Any network other than the mobile node's home network.

Home agent: A Mobile IP agent located on the mobile node's home network. The home agent keeps track of the location of the mobile node and forwards packets to the mobile node when it is away from home.

Foreign agent: A Mobile IP agent located on a foreign network. Foreign agents may help a mobile node register with its home agent and may also help deliver forwarded packets to a mobile node.

Care-of address: An IP address on the foreign network to which the home agent forwards packets. The care-of address could be either the IP address of a foreign agent, or a local address obtained on the foreign network. A protocol such as Dynamic Host Configuration Protocol (DHCP) may be used for this. The former type of care-of address is referred to as a foreign agent care-of address and the latter type of care-of address is referred to as a co-located care-of address.

Packet interception: This is the process by which the home agent receives packets destined for one of its mobile nodes. This may be implemented in Mobile IP by the use of "proxy" Address Resolution Protocol (ARP) at the home agent. With proxy ARP, the home agent answers address resolution requests for the mobile node's IP address from other nodes on the home network, giving the home agent's link-layer address as if it were the mobile node's address. The node requesting the address then uses the home agent's link-layer address to deliver packets to the mobile node, allowing the home agent to receive the packets and to forward them to the current location of the mobile node.

Binding cache: Correspondent nodes may maintain a cache of care-of addresses for mobile nodes in order to determine where to send packets destined for a mobile node.

Binding update: A message used to update a correspondent node's binding cache.

Registration lifetime: The duration for which a mobile node's registration on a foreign network is valid. It is also the duration for which a binding update is valid.

FIG. 1 illustrates the terms defined above. M is a mobile node. Node S is communicating with M, so S is a correspondent node. R2 is M's home agent. When M moves to the foreign network, R4 serves as its foreign agent. In this case, R4's address is used as M's care-of address.

Mobile IP offers a set of services to provide nodes with mobility. This section describes each of these services.

Agent Discovery: Home agents and foreign agents may advertise their availability on each link on which they provide services. In addition, a newly connected mobile node can send an explicit solicitation on a link to learn if any prospective agents are present. Foreign agents will respond to a solicitation by advertising their location. Mobile IP agent discovery is implemented as an extension to the ICMP (Internet Control Message Protocol) Router Discovery protocol. The Agent Discovery protocol extends the messages (Router Advertisement and Router Solicitation) used in the Router Discovery protocol. The messages used in Agent Discovery are thus called Agent Advertisement and Agent Solicitation.

Registration: When a mobile node is away from home, it informs its home agent of its current location using a process called registration. Depending on its method of attachment, the node will register either directly with its home agent or through a foreign agent that forwards the registration to the home agent. Registrations are valid for a fixed amount of time, or registration lifetime. If the mobile node is using a co-located care-of address, the presence of a foreign agent is not necessary and the mobile node can register directly. When the mobile node returns to its home network, it "deregisters" with its home agent to stop packet forwarding.

Tunneling: The service provided by the home agent to forward packets to the mobile node is called "tunneling". When tunneling packets, the home agent will encapsulate the original packet by placing another IP header on the front of the existing packet. This "outer" IP header has a source address that is the IP address of the encapsulating host and has a destination address that is the care-of address of the mobile host. If the care-of address is the foreign agent, the foreign agent will receive the packet, decapsulate it, and deliver it locally to the mobile node. If a co-located care-of address is used, the mobile node will receive the packet and decapsulate this packet by itself.

Figure 2:
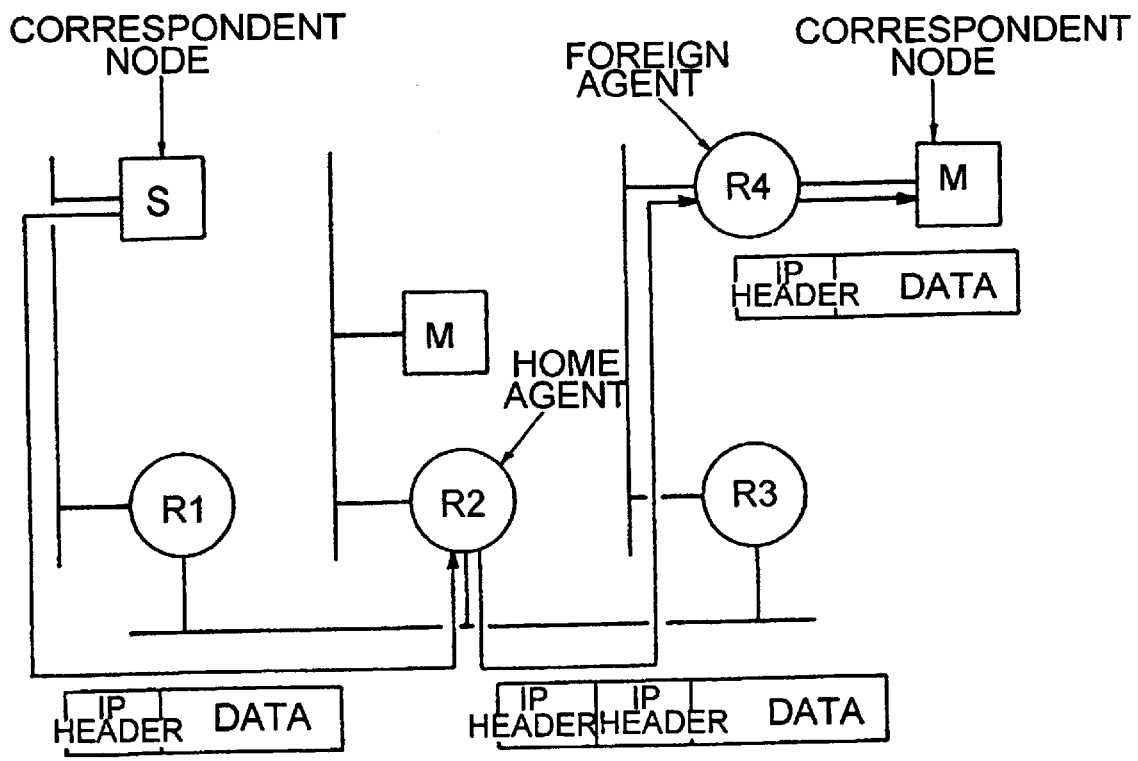
FIG. 2 is a functional block diagram showing a basic Mobile IP configuration with packet tunneling.

FIG. 2 illustrates the process of encapsulation when a foreign agent is used. During operation home agent R2 and foreign agent R4 advertise their presence using agent advertisement messages. Mobile node M is originally connected to its home network, so it operates without mobility services at this time. Mobile node M moves to a foreign network. When the mobile node detects that it is on a foreign network (because it receives the advertisements of the foreign agent), it obtains a care-of address. The care-of address is obtained from the foreign agent advertisement message sent by R4. If no node such as R4 is available to provide foreign agent services, and if the mobile node has the capability, it may attempt to obtain a co-located care-of address using a service such as DHCP.

Mobile node M registers its new care-of address with the home agent R2 through exchange of registration request and reply messages. If R4's address is used as the care-of address, the registration request and reply are sent to the foreign agent R4 which then forwards the packets appropriately. If a co-located care-of address is used, a foreign agent is not involved. When the correspondent node sends packets to M, the packets are routed to M's home network. The home agent R2 intercepts those packets and tunnels them to M's care-of address. If R4's address is the care-of address, R4 decapsulates the packets and delivers them to M locally. If a co-located address is used, the tunneled packets would be received and decapsulted by M itself. In the reverse direction, packets sent by M to S are delivered to their destination using traditional IP routing mechanisms, regardless of the location of M.

Security in Mobile IP is essential due to the fact that it concerns the ability to change the routing of packets destined to any host to be delivered to anywhere else in the Internet. Attacks on registration requests or replies could cause packets destined to the mobile node to be undeliverable or delivered to the incorrect destination. For example, another host could attempt to masquerade as a mobile node and convince a home agent to deliver packets to it. Therefore, authentication is performed by the mobile node and the home agent on all registration request and replay messages. To authenticate with its home agent, the mobile node shares a security parameter index (SPI) and a secret key with its home agent. One of several available algorithms may be used for authentication, such as keyed Message Digest version 5 (MD5) with a key size of 16 bytes. To prevent replay of any registration messages, time stamps or nonces are used to uniquely identify each registration request and reply.

Mobile IP With Route Optimization

Figure 3:
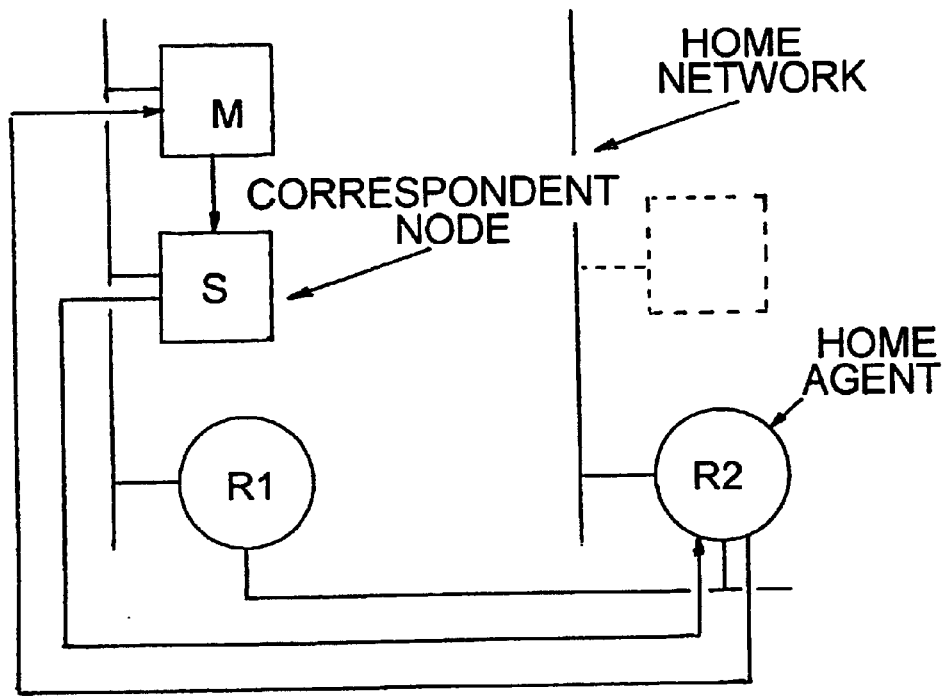
FIG. 3 is a functional block diagram showing packet routing without Route Optimization.

Basic Mobile IP allows a mobile node to move away from its home network by providing a home agent to intercept packets destined for the mobile node's home address. In a typical situation, as shown in FIG. 3, the mobile node M, depicted here is away from its home network and is conversing with a correspondence node S, located on the foreign network to which the mobile node is currently connected. When mobile node M sends a packet to correspondent node S, the packet will be routed directly to correspondence node S using traditional IP routing. When correspondent node S sends a packet to mobile node M, however, the packet will first be routed back to the mobile node M's home network. The mobile node M's home agent R2 will intercept this packet and tunnel it to the mobile node's current foreign agent R1. When the foreign agent R1 receives the encapsulated packet, it is decapsulated and then sent to mobile node M.

Figure 4:
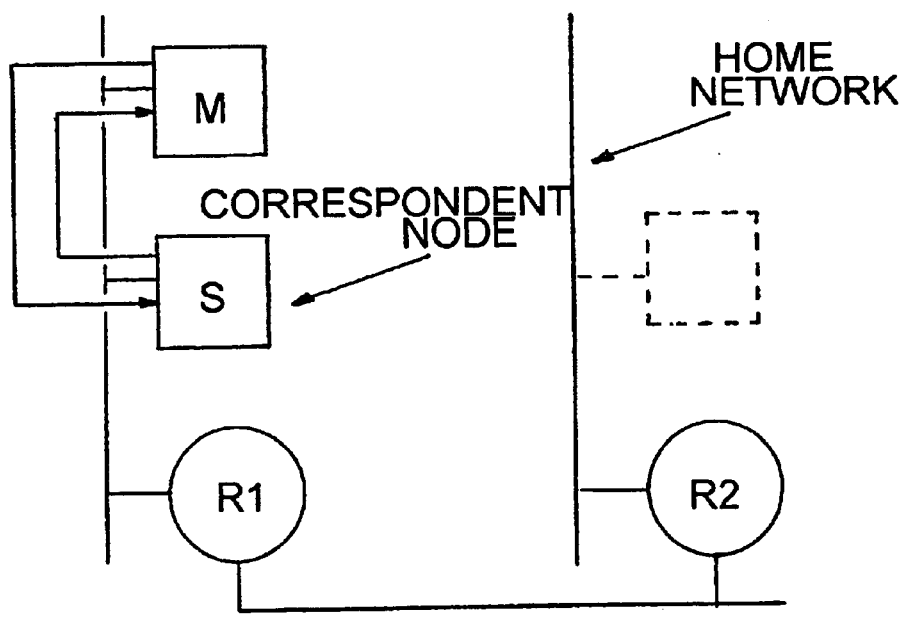
FIG. 4 is a functional block diagram showing packet routing with Route Optimization.

Alternatively, the packets may be routed more optimally by sending the packets directly to each other over the local network as shown in FIG. 4. Route Optimization for Mobile IP optimizes the path that packets travel from correspondent nodes S to mobile nodes M. Any type of optimization of the routing of packets from correspondent nodes S to mobile nodes M requires the correspondent nodes S to keep information about the current location of the mobile nodes M. Each correspondent node S that supports Route Optimization must maintain a cache of care-of addresses, called a binding cache. When a correspondent node S sends a packet, it checks its binding cache for an entry corresponding to the destination address of the packet. If a matching entry is found, then the correspondent node S itself will encapsulate the packet with the care-of address specified in the binding cache entry, tunneling the packet directly to the care-of address instead of sending it to the mobile node M's home network.

If a binding cache entry is not found, then the packet is sent using traditional IP routing which, as before, causes the packet to be sent back to mobile node M's home network. When the home agent R2 intercepts the packet, it assumes the source host does not have a binding cache entry for the mobile node M. The home agent R2 will respond by sending an authenticated binding update to the correspondent node S to inform it of mobile node M's current care-of address before tunneling the packet to mobile node M's current location. The home agent R2 will set the lifetime of the binding update to the amount of time remaining for the registration of that particular mobile node M. When the original source receives and authenticates the binding update, it adds the binding update to the binding cache for future use. Binding updates expire after the amount of time that is specified by home agent R2.

In order for a correspondent node S to use Route Optimization, a software process must be operating to receive and process binding updates. If the host does not use the Route Optimization software, then packets are routed in the same way as in basic Mobile IP. Because some correspondent nodes S will not have this Route Optimization software, home agents R2 must have an algorithm to limit the rate at which they send out binding updates to each correspond host S, since otherwise, a home agent R2 might flood the network with binding updates to a correspondent node S that ignores them.

Intelligent Switching System

Figure 5:
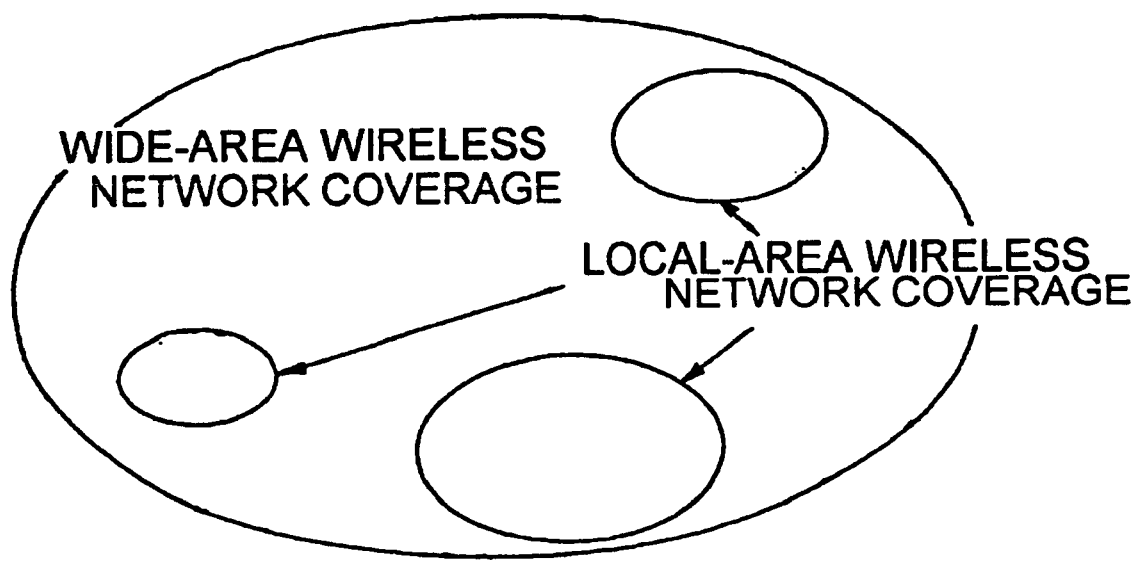
FIG. 5 is an overview diagram showing an example of coverage of local area and wide area wireless networks.

The present network system incorporates multiple technologies to offer the best qualities from each network, including a wide area wireless network that provides low-speed coverage over a site and one or more local area wireless networks as shown in FIG. 5, each providing high speed coverage over a portion of the site. As mobile nodes move through the network, they are continuously within the range of the wide-area network and will move into and out of areas of local area coverage. The network technology to use in a particular situation is selected based upon the needs of each specific application. A single, composite network made up of sub-networks using different technologies thus provides a total solution. The flow of data in this network takes the most efficient route from the source to the destination, depending on the characteristics of the technologies of the particular sub-networks. For example, if a high speed local area communication link is available between two nodes that want to exchange communication, then that communication path could be used, as opposed to a slower, wide-area link that might also be available. If no other means of communication between two nodes is available, a wide area network could be available by default.

In a preferred embodiment, Mobile IP is used to switch between networks as described hereinabove. The Mobile IP scheme has the advantage that it requires no changes to the routers or non-mobile nodes in the network. The protocol, however, does not specify when to change sub-network connections.

The present system provides the basic Mobile IP protocol with instruction about which network connection to establish while requiring minimal change to the standard Mobile IP protocol. In the present system, no input from a human operator is required since some mobile nodes may not carry operators and if they do, the operator should be able to focus attention on operating the equipment, not on trying to determine if a network handoff should occur. Additionally, one of the inputs into the process of deciding when to switch networks is an estimate of the quality of the wireless communication signal from a correspondent on the local area network. The current levels of signal strength and noise or interference could be used to predict future values or recorded for later use. In addition to being able to estimate this signal quality value, a threshold value is established for a particular local area network technology. This value is the minimum satisfactory signal quality value for the hardware and is obtained either directly from the hardware or from the hardware's specifications. Another useful input to the decision process is knowledge of the current locations of the mobile nodes. This type of input may be combined with knowledge of the locations of wireless local area network transmitters to estimate values of signal quality.

In order to provide realistic models of RF propagation, the present system includes a description of the actual terrain surrounding the mobile node. Using the RF propagation model, the switching system attempts to predict when handoffs will be required in order to minimize the time that a mobile node might be disconnected from the network. The switching system predicts a future value of the signal quality for communications on the local area network connection. This signal quality value is then compared to the specified threshold. If the predicted value exceeds the threshold, the switching system tells Mobile IP to attempt to communicate using its local-area network interface; otherwise, the switching system tells Mobile IP to communicate using the wide-area network connection.

Switching System Architecture

Figure 6:
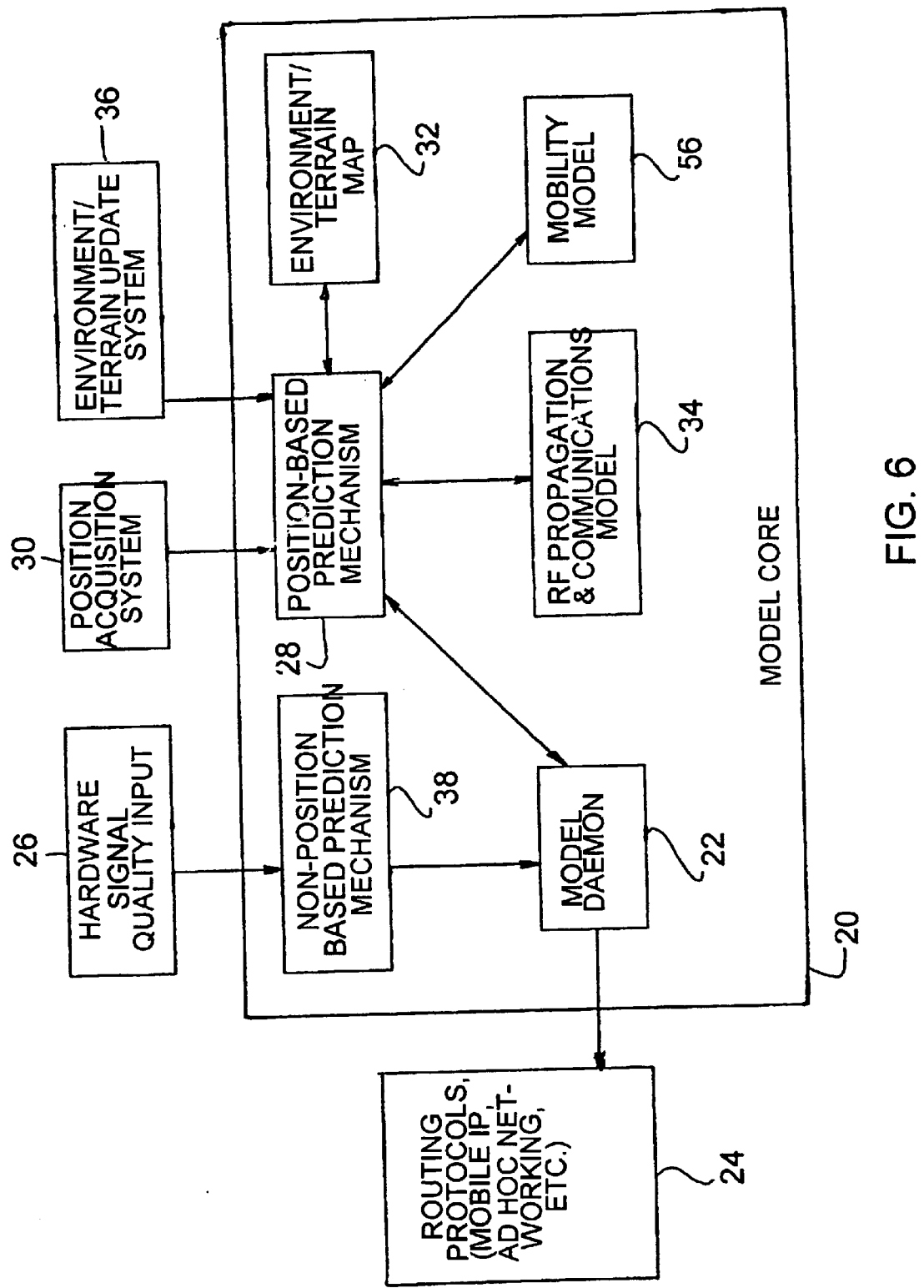
FIG. 6 is a functional block diagram of the present switching system architecture.

The components of a preferred embodiment of the present system are shown in FIG. 6. Model Core 20 contains a set of components such as Model Daemon 22, position-based prediction mechanism 28, environment/terrain map 32, RF propagation and communications model 34, non-position-based prediction mechanism 38, and mobility model 56, that provide the central functions of the switching system. The switching system has a modular design so that improvements in the supporting technologies may be incorporated. Model Daemon 22 is a state machine that keeps track of the current state of the mobile node and makes switching decisions based upon this state and inputs from two other sources which are a position-based prediction mechanism 28 and a non-position based prediction mechanism. Model Daemon 22 also sends commands to the Mobile IP software 24, the component of Mobile IP that allows mobile nodes to inform their home agents R2 of their current location.

Figure 7:
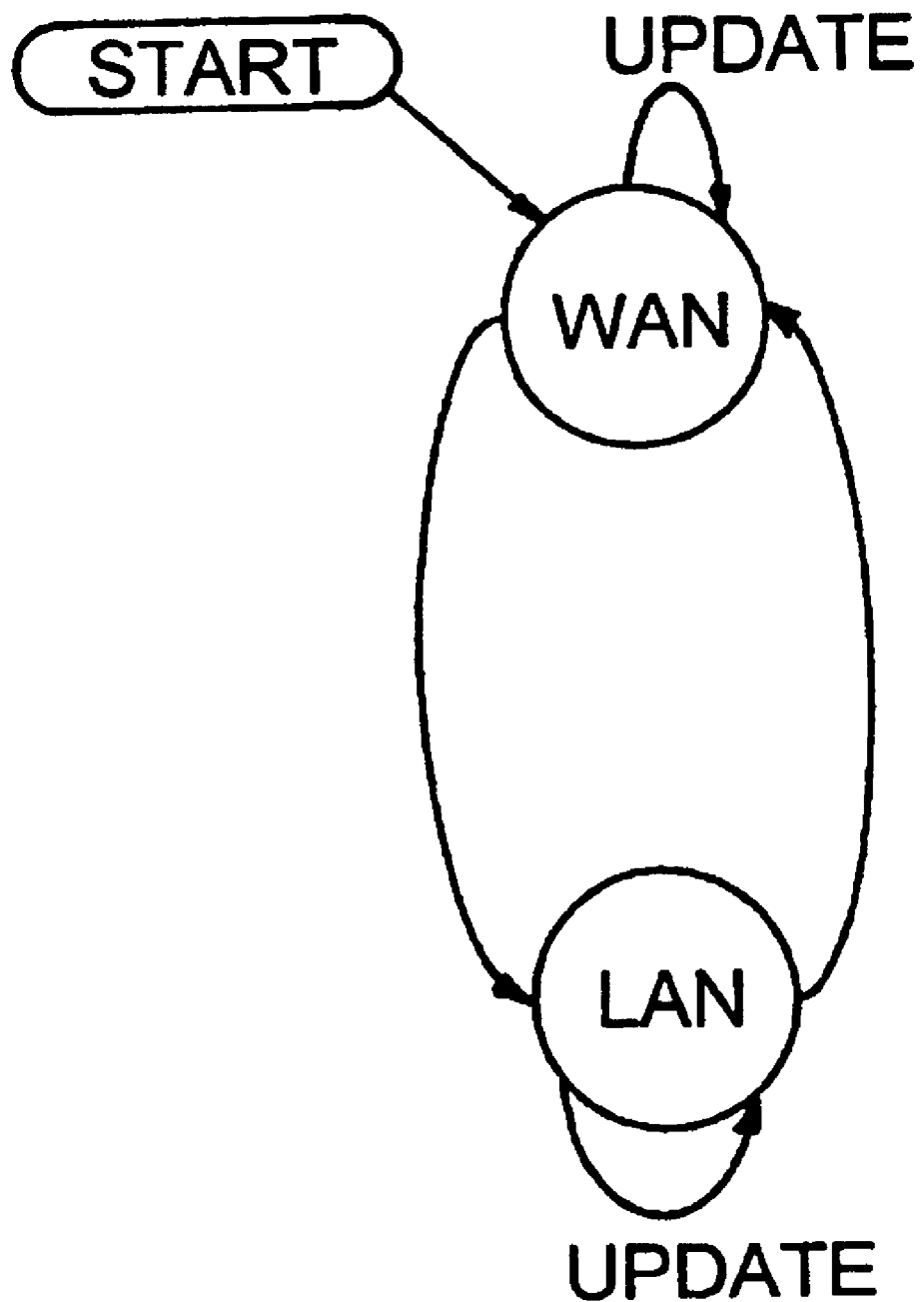
FIG. 7 is a diagram of the state machine that the Model Daemon uses to make switching decisions.

FIG. 7 shows the state machine that Model Daemon 22 uses to make its switching decisions. When Model Daemon 22 begins execution, it starts in the WAN state (where "WAN" refers to the network interface that Mobile IP is commanded to use, in this case, the wide-area network interface). The wide area network was chosen for the initial state for the present system because of the assumption that the wide area network will always be available. From this state, a number of things can happen. First, if nothing else occurs, Model Daemon 22 will send an "update" command to the Mobile IP software on this node. Update commands are sent periodically to ensure that the Model Daemon 22 and mobile node M remain synchronized.

The only way for Model Daemon 22 to leave the WAN state is if Model Daemon 22 decides that the empirically collected signal strength values (i.e., those read directly from the local-area network interface hardware) suggest that a stable connection to the local area network (LAN) can be made. In a preferred embodiment, this occurs when the Model Daemon 22 reads several consecutive values of signal strength or hardware signal quality input 26 from the LAN hardware that are above the LAN signal strength threshold.

Once the Model Daemon 22 has entered the LAN state, it can only leave if one of the prediction systems described below predict a future value of signal strength that is below the LAN threshold. If this occurs, a command to switch to the WAN interface is sent to the Mobile IP software on this node, and Model Daemon 22 enters the WAN state again. Model Daemon 22 sends "update" commands while in the LAN state to insure that the Model Daemon 22 and Mobile IP software remain synchronized.

The decision to switch from the LAN interface to the WAN interface is made based upon predicted information, while the decision to switch from WAN to LAN is made based upon empirically measured data. This distinction is made in order to minimize the possibility that a mobile node could be instructed to use the local area network interface when that network is not actually available. The result of this is that the rules for changing state make it easier to enter the WAN state, since the wide area network connection is assumed to always be available.

Another important point is that Model Daemon 22 has no concept of home or foreign. It only knows about network interfaces. The decision of whether the mobile node M should be home or foreign is left up to the Mobile IP software or routing protocols 24 (FIG. 6) and is not affected by the presence of the Model Daemon 22.

Referring again to FIG. 6, a position-based prediction mechanism 28 accepts as an input the current position of the mobile node from position acquisition system 30, translates this information into coordinates on the environment/terrain map 32, and predicts the motion of mobile node M to a new point. The position-based prediction mechanism 28 also provides the coordinates as inputs to the RF propagation and communications model 34 that calculates future signal strength values at one or more locations at the site using equations for RF wave propagation.

Hardware for reliably acquiring position information, such as differential global positioning systems (DGPS), is readily available commercially. The present switching system has a default position prediction system such as the environment/terrain update system 36 that operates correctly even if the position information is not available. To this end, the present system includes the non-position-based prediction mechanism 38 that keeps track of empirically collected signal strength values and extrapolates a set of data points to come up with a future value.

The extrapolation performed by non-position-based prediction mechanism 38 can be as complex as necessary, taking into account many historical values or just a few, and combining them in a polynomial or fitting them to a curve. An example of a simple implementation includes defining a line using the two most recently collected signal strength values. A third point is extrapolated along this line, becoming the predicted signal strength value. A more useful mechanism would be able to predict further in the future than just the next point in time. To this extent, a more complex model can be used that fits a curve through a series of points, taking into account the past behavior of the system.

Figure 8:
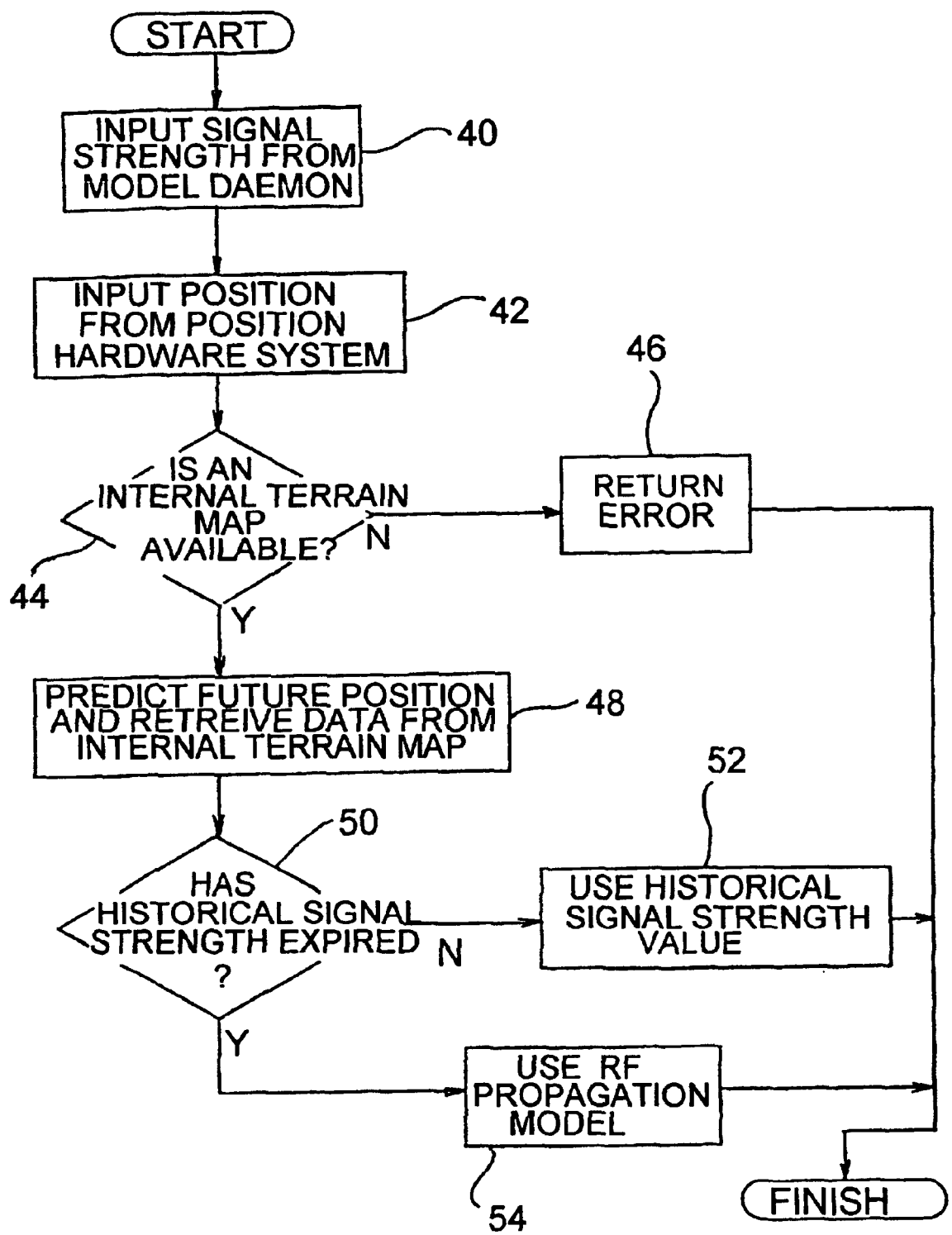
FIG. 8 is a flowchart showing an example of position-based prediction.

The position-based prediction mechanism 28 is part of Model Core 20, and uses information from a number of sources including the environment/terrain map 32, position acquisition system 30, the RF propagation and communications model 34, the environment/terrain update system 36, and the mobility model 56 to provide a predicted value of the future signal strength to Model Daemon 22. FIG. 8 shows a flowchart of the decision process for predicting a signal strength value. When the position-based prediction mechanism 28 is invoked at block 40, it first attempts to collect input on the current state of the mobile node. The current strength of local area network communication is acquired from Model Daemon 22, which previously read the data from the local area network hardware. The current position of the mobile node is gathered from whatever position system is available as shown at block 42. Once these inputs have been collected, the present system checks to see if the environment/terrain map 32 for the current location of the mobile node is available at block 44. If no environment/terrain map 32 is available for this point, a return error is generated at block 46 and the position-based prediction mechanism 28 cannot be used. Model Daemon 22 will default to using the value from the non-position-based prediction mechanism 38.

If the environment/terrain map 32 for this point is available, then the present switching system attempts to predict a future position of the mobile node at block 48. The future position of the mobile node is resolved to a specific entry in the environment/terrain map 32. The data stored in that location, specifically the historical signal strength value and the time it was collected, is retrieved. Once the historical value has been retrieved, the system stores the current signal strength value along with the current collection time in the environment/terrain map 32 at the position specified by the current location. The amount of time that has elapsed since the collection time is calculated and compared against the age threshold associated with the current terrain map at decision block 50. If the elapsed time is less than the threshold, then the historical value is used as the predicted value at block 52. Otherwise, a calculation must be performed using RF propagation and communications model 34 to predict a future signal strength value at block 54. The predicted signal strength value can then be returned to Model Daemon 22 to be used as input into its threshold comparisons, as described above.

Model Daemon 22 can learn about its environment from places that it has been to before by using the historical signal strength values. When a mobile node is using its local area network connection, it can record a collection of signal strength values as historical values in its environment/terrain map 32. If the mobile node leaves the area to perform a task, and returns at a later time to roughly the same place that it occupied previously, it could use the historical signal strength value as the predicted signal strength value, making the RF propagation calculations unnecessary.

The historical values may be aged in situations where the terrain in some areas of local area network coverage change faster than other areas. The model allows each area of local area network coverage to have its own age threshold. For purposes of example only, the terrain near a site operations center is likely to be fairly static, since operations typically do not take place near the site operations center. If this is the case, the age threshold for the site operations center can be relatively long, such as a week or so. The age threshold of a work area might only be valid for a relatively short period of time where the terrain changes more rapidly. If a mobile node returns to a location that it has been to within the limit of time set by the age threshold, then Model Daemon 22 can use the historical value as the predicted value. Otherwise, Model Daemon 22 must calculate an entirely new value. A more complicated aging system could be devised which would slowly age the historical values in the manner of a half-life, possibly combining them in a weighted polynomial with a value predicted by the RF propagation and communications model 34.

In a preferred embodiment of the present system, the position acquisition system 30 is a differential global positioning system (DGPS) system, although another technology could be substituted. The desirable resolution (size in meters of each grid) of the environment/terrain map 32 is a parameter for the present switching system. One constraint on this resolution is that it cannot be finer than the accuracy of the DGPS equipment. Smaller grid resolution also requires more storage space for the environment/terrain map 32 and more computationally intensive RF propagation model calculations. A larger grid size will allow faster calculations and less storage space, but will represent the terrain with less accuracy, generally leading to less accurate RF propagation calculations. The resolution of the "grid" of the terrain map should not exceed the resolution of the position information. The position information may be represented in units of degrees of latitude and longitude, or in Cartesian coordinates having a reference frame fixed in space. Additionally, it should be noted that the model is not limited to use on a map with a fixed grid. For example, maps having irregular mesh descriptions of the terrain are possible.

The environment/terrain map 32 can be thought of as a grid that has been placed on the ground over areas where local area network coverage exists, or where wide area network coverage exists, or, in general, the environment/terrain map 32 could exist for all areas, regardless of network coverage. At each square in the grid is a storage location which holds three values. The first is an elevation value corresponding to the altitude of the terrain at that point above sea level (or some other reference point). The second value is a signal strength value. As a mobile node traverses the actual terrain, Model Daemon 22 tracks its position across the environment/terrain map 32 and records the empirically collected values of signal strength into these storage locations. The third value stored is the time at which the most recent signal strength value was collected.

Figure 9:
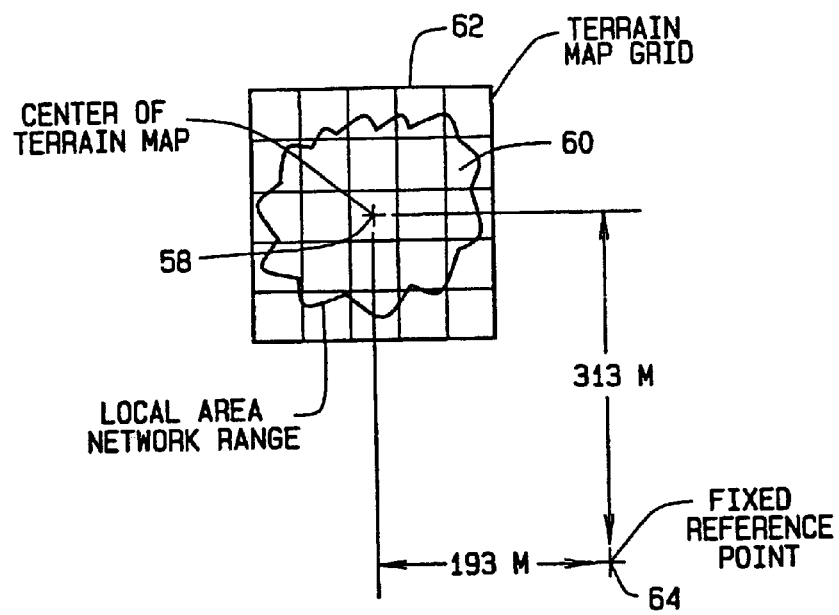
FIG. 9 is an overview diagram of a terrain map.

An initial terrain data file or mobility model 56 (in FIG. 6) contains the elevation information for the terrain of the local-area network in question. The file also specifies the Cartesian coordinates of the center of the environment/terrain map 32, as an x and y offset in the desired units of measurement from a fixed reference location, the "size" of the terrain map in terms of range and resolution in meters, and the age threshold, mentioned earlier. FIG. 9 depicts some of these concepts. The fixed reference location 58 is the origin of the Cartesian coordinate system. Overlaying an outline 60 representing the range of the local area network is an imaginary grid 62 representing terrain map 32. The center of the wireless local area network is located at the center of the terrain map grid 62, and the grid extends beyond the edges of the coverage of the wireless local area network as represented by outline 60. The initial terrain data file 56 containing the elevation information for this local area network coverage region specifies the center of the terrain map 32 with respect to fixed reference point 64. With knowledge of its current position relative to the fixed reference point 64, a mobile node can determine which, if any, of its available terrain maps 32 are appropriate for use at a particular position.

The environment/terrain update system 36 for calculating a future position of the mobile node several seconds in the future provides Model Daemon 22 with sufficient warning to send switch commands before network connectivity is lost completely. In the present system, various position prediction methods may be used ranging from using the two most recently collected positions of the mobile node and projecting the path of the mobile node along a straight line running through these two points to more complex position prediction systems that fit a parametric curve, such as a Bezier curve, through a series of recently collected positions. A more complicated prediction system could make intelligent predictions of motion based upon the surrounding terrain or knowledge of commonly followed routes through the terrain (i.e., roads) and the dynamic characteristics of the unit.

In the current system, the RF propagation and communications model 34 produces an estimate of the signal strength of local area communications that a mobile node would receive based upon a predicted position of the mobile node, the position of a transmitter (usually a local area network access point or base station), the terrain between the two, and the radio frequency used by the transmission equipment. A preferred embodiment of RF propagation and communications model 34 models the effects of natural terrain on electromagnetic wave propagation in real-time. This model utilizes a two-dimensional path loss model based on information stored in the environment/terrain map 32. The two-dimensional model treats terrain as if it exists within a vertical plane between an RF transmitter and receiver. RF transmissions can go over or under the terrain, but they cannot leave the plane to go around terrain features. In order to construct the two-dimensional model, a vertical plane is intersected between the x, y, and z coordinates of transmitting and receiving antennas in the environment/terrain map 32. Two calculations are then performed on this slice of terrain. First, a free space estimate of the RF wave propagation from the transmitter to the receiver is calculated using the following equation:

$$P_r = P_t G_t G_r \Box^2/((4\Box)^2 d^2 L)$$

where:

$P_t$=the transmitted power
$G_t$=the gain of the transmitting antenna
$G_r$=the gain of the receiving antenna
$\Box$=transmitted wavelength
d=the distance between the antennas
L=a system loss factor This calculation estimates the received power of the transmissions as if the two antennas were in a free space, with no obstructions of any kind. Next, a plane earth calculation is performed. In a plane earth estimate of RF propagation, another path from the transmitter to the receiver is taken into consideration, the reflected path from the transmitter to the ground to the receiver, using the following equation:

$$P_r = P_t G_t G_r h_t^2 h_r^2/d^4$$

where:

$P_t$=the transmitted power $G_t$=the gain of the transmitting antenna $G_r$=the gain of the receiving antenna $h_t$=the transmitter height $h_r$=the receiver height d=the distance between the antennas Once both of the calculations have been performed, the lesser of the two (representing the "worst case" received power) is used as the basis for the next steps in the modeling calculations. Some of the power of RF waves is carried by secondary waves that do not travel on the direct path from the transmitter to the receiver. These secondary waves reach the receiver after being diffracted by point-sources existing between the transmitter and receiver and carry an important component of the total transmitted power. Even if a direct line of sight exists between the transmitter and receiver, these secondary waves may still be blocked, reducing the total received power. A Fresnel zone refers to a category of these secondary waves based upon the path that the waves travel. Adequate Fresnel zone clearance means that there is no significant loss of power because enough of these secondary waves are able to reach the receiver. Fresnel zone clearance is calculated as known in the art depending on which of the following criteria is met:

1. A line of sight exists between the transmitter and the receiver and there is adequate Fresnel zone clearance. In this case, the base value calculated before is used as the received power.

2. A line of sight exists between the transmitter and the receiver but there is not adequate Fresnel zone clearance. The received power is reduced further from the base power by the loss of secondary waves.

3. No line of sight exists between the transmitter and receiver. In this case, only some of the secondary waves are able to reach the receiver.

The result of these calculations are then passed back to the position-based prediction mechanism 28. A method for calculating a three-dimensional RF propagation model may be used as an alternative to the two-dimensional model. The three-dimensional model will typically require greater data processing resources. Those skilled in the art will recognize that any other RF propagation model could be used as well as the above described model.

Quality of Service Characteristics

The present network is primarily concerned with two main quality of service (QOS) parameters: throughput, which is the average amount of data delivered per time unit, usually measured in bits/second or packets/second, and delay, which is the average length of time for a packet to travel from source to destination. The present network makes use of the highest bandwidth path from the source to the destination through the use of Route Optimization and the intelligent switching system. When a high speed, wireless, local area network link is available, it will typically be used instead of the wide area link.

Figure 10:
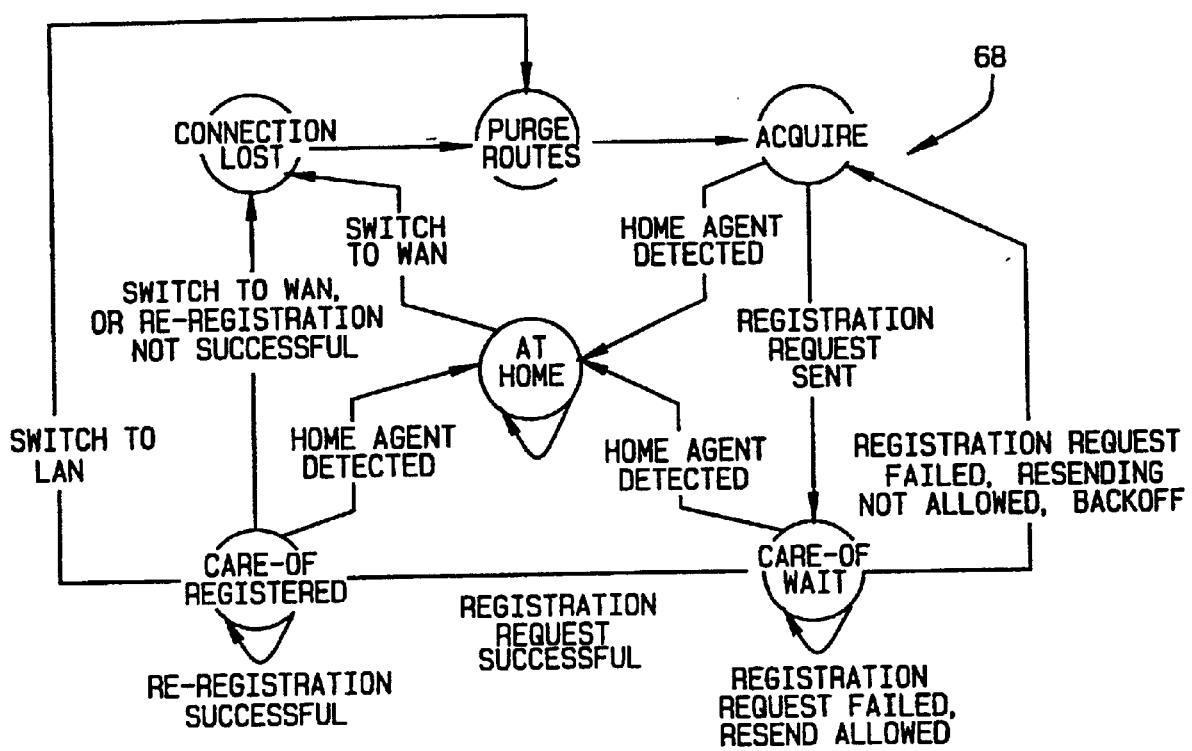
FIG. 10 is a diagram of the state machine for the present switching system.

FIG. 10 shows a state diagram 68 for the present switching system wherein a mobile node can only attach to its home network when it is using its local area network interface. The present system begins with the Connection Lost state which clears some internal variables, disables the local area network interface, and enables the wide area network interface. Control then passes to the Purge Routes state, which clears the routing information stored by the mobile node. In the Acquire state, the mobile node attempts to register with its home agent by sending registration requests on all available network interfaces. Control is then automatically transferred to the Care-of Wait state, where the mobile node waits for a response from its registration requests. If the attempts to register fail, the mobile node will re-send the registration requests, remaining in the Care-of Wait state. If re-sending is not allowed, the mobile node will return to the Acquire state and generate new registration requests. If the registration request is successful, the mobile node enters the Care-of Registered state, which corresponds to the Mobile IP notion of being attached to a foreign network. The mobile node can remain in this state indefinitely, as long as re-registration attempts on the same interface that was used previously are successful. Registration attempts can only be made using an interface that is enabled and the mobile node can then be instructed to communicate with a specific interface. If these registration attempts fail, the mobile node returns to the Connection Lost state, and the process begins again.

In addition to the failed registration attempt, the mobile node may leave the Care-of Registered state if a switch command is received from the Model Daemon 22 instructing the mobile node to switch from its local area network (LAN) interface to its wide-area network (WAN) interface. In this case, the mobile node enters the Connection Lost state. If the switch command is to change from the wide-area network interface to the local area network interface, the system must first enable the local area network interface and disable the wide-area network interface. At this point, the system cannot enter the Connection Lost state, because this would change the enable/disabled state of the network interfaces again. Instead, the Connection Lost state is skipped and the Purge Routes state is entered directly. Then, once in the Acquire state using the local-area network interface, the system will either enter the At Home state (if the mobile node is attached to the home network) or eventually the Care-of Registered state (if the mobile node is attached to a foreign network).

At many different places in the state diagram 68 the mobile node attempts to detect if its home agent is present on the directly connected sub-networks. If a home agent is detected (because the mobile node receives home agent advertisement messages), the mobile node immediately enters the At Home state. Once in the At Home state, the mobile node will remain there until it receives a command to switch to the wide area network interface, at which point it will enter the Connection Lost state.

Figure 11:
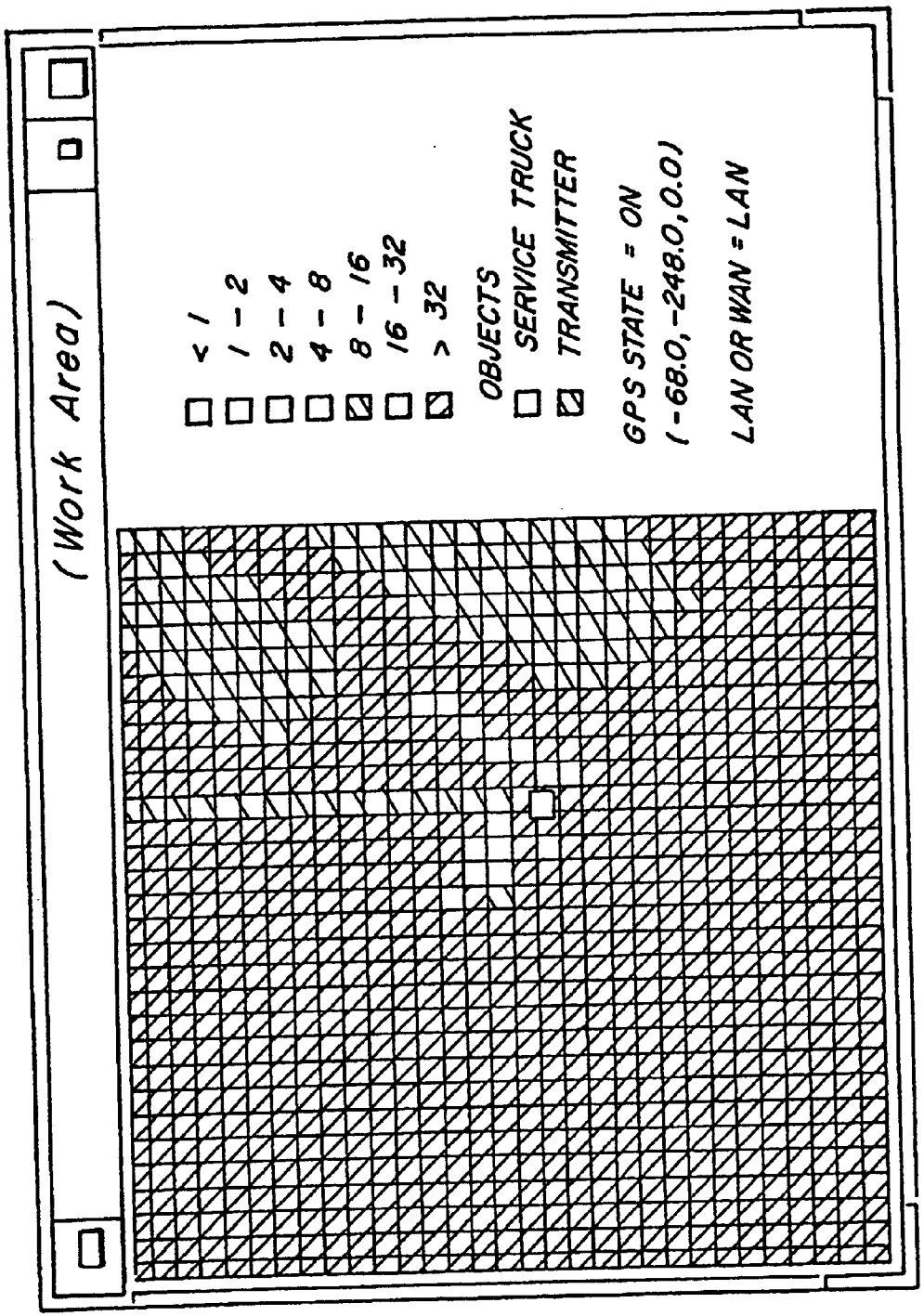
FIG. 11 is a view of a graphical user interface for the present switching system.

A graphical user interface (GUT) may be provided with the present system in order to monitor the state of the mobile node, as shown in FIG. 11. The switching system GUT consists of a representation of the terrain map 32 and a display of state information. The terrain map is displayed in a grid having the desired dimensions, with the local area network transmitter defining the center of the local area network for the terrain map designated in black at the center of the grid. The height of the terrain may be indicated by colors on the map or other means such as topological elevation lines. The current coordinates of the mobile node, in this case a service truck, relative to the fixed reference, are displayed to the right of the map, and the mobile node's position is shown by the white square on the map. The GUT also displays information about which interface the mobile node is currently using (the LAN or WAN interface) and about the quality of the DGPS information (ON or OFF). Further information on the GUI shows that the mobile node (i.e., the service truck) is at a work area, with coordinates of (−68, −248, 0). Further, the mobile node is using its LAN interface and its DGPS equipment is functioning correctly.

Wireless Local Area Network

The present system requires a local area network in order to provide mobile nodes with the ability to communicate at high speeds to nearby fixed computers or other nearby mobile nodes. One such local area network is WaveLAN, which is a product developed by Lucent Technologies. The modular architecture of the present system can accommodate any local area network technology desired, however. The bandwidth of the local area network used with the present invention must be high enough to support such traffic as isochronous voice data, and burst, high volume traffic such as file transfer and image data. The local area network must also provide access to signal strength measurements for use in the switching system. This signal strength data is a measure of the received power of packets transmitted by another wireless host.

The local area network must also allow peer-to-peer communication.

Wireless Wide Area Network

Another important piece of the present network architecture is the wireless wide area network technology, as it provides communication coverage throughout the entire area operation and constitutes the default communication path for the different entities of the system. Any wide area network technology used with the present network architecture must provide certain capabilities in order to efficiently support the traffic characteristics of the present network architecture. One capability is that the wireless wide area network should be chosen to provide coverage of the entire work site. Preferably, this coverage should not restrict the network to line-of-sight placement of transmitters. The network must also provide point-to-multipoint or broadcast capabilities. Further, support for packetized data is necessary in order to carry the IP traffic of the network. Additionally, although guaranteeing wide area coverage often compromises the ability to provide high bandwidth, a fair trade off is recommended since this feature will highly impact the performance of the overall system. An example of a suitable wide area network is the RFM96 Radio Modems, manufactured by Pacific Crest Corporation. The Pacific Crest are configured to transmit with a power of 2 watts, giving them enough range to completely cover a large area without line of sight placement of antennas. Another alternative for a wide area network is the use of low earth orbit satellites, which are currently under development.

Use With Ad Hoc Networking

In addition to the use of prediction and the RF propagation model with Mobile IP, the present invention can also be used in a similar fashion in ad hoc networks. An ad hoc network is a collection of wireless mobile hosts forming a temporary network without the aid of any established infrastructure or centralized administration. In such an environment, it may be necessary for one mobile host to enlist the air of other hosts in forwarding a packet to its destination, due to the limited range of each mobile host's wireless transmissions.

Industrial Applicability

The present invention is applicable in situations where several entities, such as autonomous or semi-autonomous machines, and operators must coordinate actions to accomplish tasks as efficiently as possible. For example, a single site operations center may direct the effort of the machinery for an entire site, collecting information about the status of the machinery, and the status of the task to be accomplished. In addition, there is a need for communication between machines and operators to allow close cooperation between them. Information must also be communicated to service and maintenance personnel to alert them to problems that may slow down or halt performance of the machinery. The present invention accommodates a wide range of different types of messages including alert messages, network management messages to allow communication between nodes, detailed information about the location of all machinery and the current state of the task or tasks being performed, audio transmissions, diagnostic and service manual information, and image data to allow machines to cooperate with one another and to aid in the diagnosis of faults. The present invention provides the ability for machines to roam between different wireless network technologies using the Mobile IP protocol with Route Optimization, peer-to-peer communication, and an intelligent switching system.

Figure 12:
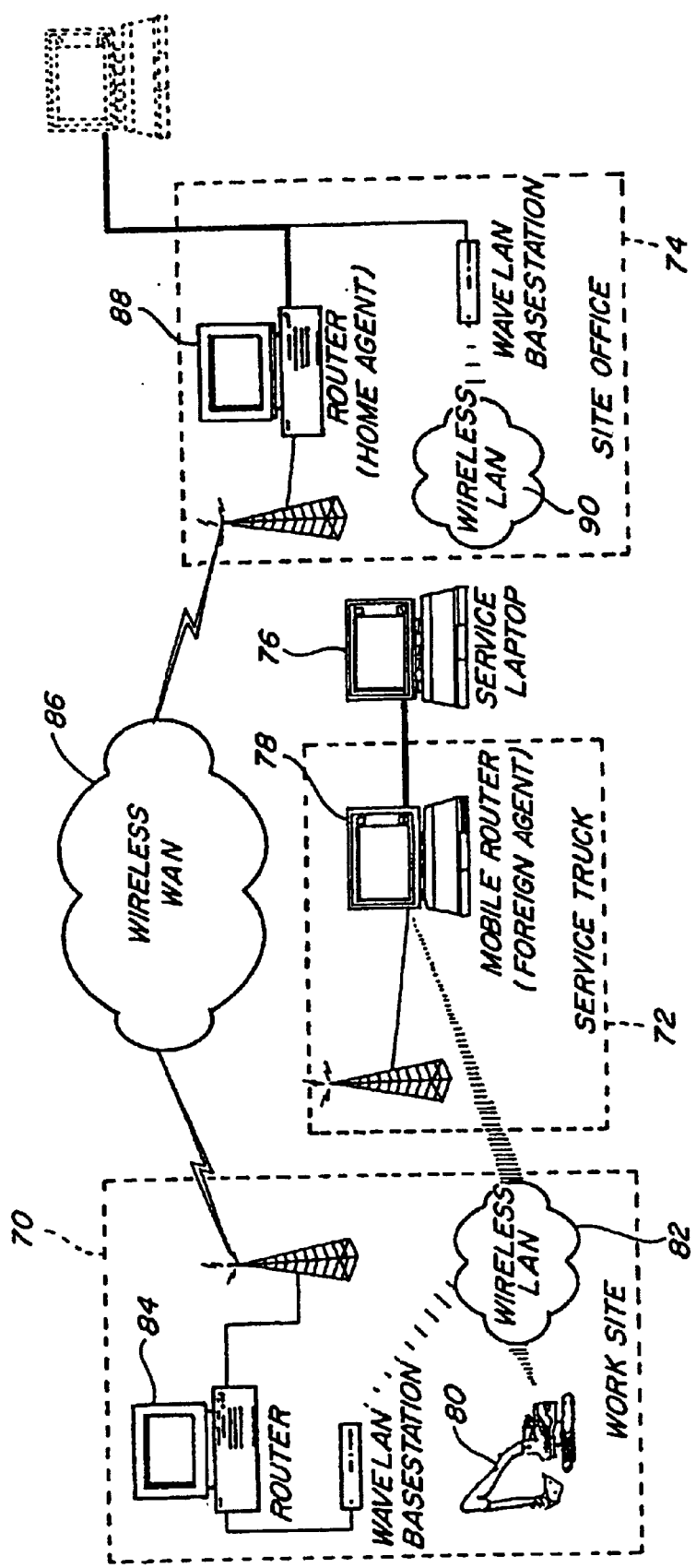
FIG. 12 is a view of a work site wherein the present invention may be utilized.

FIG. 12 shows an example of components that are included at a work site 70, a service truck 72 for servicing the machinery at work site 70, and a site office 74. In this example, a service technician has the ability to take service laptop 76 from the network at site office 74 and attach it to the mobile network on the service truck 72 where it registers with mobile router 78. When a mobile node, such as excavator 80 begins operation, it sends a packet containing a status message to service truck 72. The packet originates from excavator 80 and is sent over wireless local area network 82 to router 84 at work site 70. The work site router 84 is implemented on a host computer system having data input/output capability and executing software to handle IP data packets, determine the destination address, and forward the packet over wireless wide area network 86 to the default home agent for excavator 80, which is router 88. Router 88 at site office 74 receives the packet, determines its destination address, and forwards the packet to local, area network (LAN) 90. Before the packet is sent out over LAN 90, router 88 encapsulates the packet with the service laptop's 76 care-of address as the destination address, and forwards the packet over local area network 82.

Home agent router 88 determines the source of the original packet (the excavator 80) and sends a binding update to excavator 80, informing it of the current care-of address of service laptop 76, which is the mobile router's 78 address. Before the encapsulated packet can be sent out over the local area network 90 to the service laptop's 76 foreign agent 78, the home agent router 88 intercepts the packet again. This time, the home agent encapsulates the packet with the mobile router's 78 care-of address as the destination address, and forwards the packet over the wide area network 86. The home agent again determines that the excavator 80 is the original source of the packet and sends a binding update to it, telling it the current care-of address of the mobile router 78. The router 84 at work site 70 receives the packet from the wide area network 86 and forwards the packet over wireless local area network 82. The mobile router 78 receives the packet from wireless local area network 82 and removes the first encapsulation. The mobile router 78 attempts to forward this inner packet to the correct location. The destination address of this inner packet is the mobile router's 78 own address, so it instead processes the inner packet itself by removing the inner encapsulation and forwarding the packet to service laptop 78.

The service laptop 76 receives the packet and replies to the excavator. The packet is first sent to the mobile router 78, since it is the service laptop's 76 default router. Using the wireless local area network's 82 peer-to-peer communication capabilities, the mobile router 78 forwards the packet directly to excavator 80 using wireless local area network 82.

The excavator 80 receives the packet. Excavator 80 also receives the two binding updates from the home agent 88. The excavator 80 uses the binding updates to add entries to its binding cache. Once the excavator has binding cache entries for the service laptop 76 and the mobile router 78, it can send packets using Route Optimization until the binding cache entries expire. The excavator 80 first checks its binding cache, then the packet is encapsulated using the service laptop's 76 care-of address as the destination address, which is the mobile router's 78 address. The excavator 80 again finds an entry in its binding cache, this time for mobile router 78. The packet is encapsulated a second time using the mobile router's 78 care-of address as the destination address. The packet is then sent over the wireless local area network 82. Using the local area network's 82 peer-to-peer capabilities, the packet is delivered directly to the mobile router 78. Mobile router 78 receives the packet using wireless local area network 82 and removes the first encapsulation. The mobile router 78 attempts to forward this inner packet to the correct location. The destination address of this inner packet is the mobile router's 78 own address, so it instead processes the inner packet itself by removing the inner encapsulation and forwarding the packet to service laptop 76. Service laptop 76 receives the packet and replies to the excavator 89. The packet is first sent to the mobile router 78, since it is the service laptop's default router. Using the local area network's 82 peer-to-peer capabilities, the mobile router 78 forwards the packet directly to excavator 80 using wireless local area network 82. The excavator 80 receives the packet.

Since the excavator has binding updates for the service laptop 76 and the mobile router 78, the packets are no longer routed over the wide area network 86. This utilizes network resources efficiently and minimizes the use of the low speed wide area network. Note that in the foregoing example, the Route Optimization software on the excavator 80 must perform double encapsulation in order to send packets directly to the service laptop 76.

The example discussed above included only one work site, however, the present invention may be implemented to cover multiple work sites and multiple machines at each work site.

Other aspects, objects and advantages of the present invention can be obtained from a study of the drawings, the disclosure and the appended claims.

What is claimed is:

1. A method for communicating between a first communication node and a second communication node in an area having a plurality of communication nodes, the method comprising the steps of:
   (a) generating, at selected time intervals, a propagation model of signals generated by selected communication nodes in the area based on an environmental map, the environmental map including the topography of terrain and structures in the area; and
   (b) predicting quality of communication at a location at a future time based on the propagation model.

2. The method, as set forth in claim 1, further comprising the step of (c) predicting quality of communication at a future time based on a predicted location of the communication nodes as a function of the speed and direction of travel of the communication nodes.

3. The method, as set forth in claim 1, further comprising the step of (c) predicting quality of communication at a location at a future time based on a previous quality of communication at a predicted location of a communication node.

4. The method, as set forth in claim 1, further comprising the step of (c) selecting a path of communication having a desired predicted quality of communication.

5. The method, as set forth in claim 1, further comprising the step of (c) predicting quality of communication at a future time based on a predicted location of the communication nodes as a function of the speed and direction of travel of the communication nodes, and (d) predicting quality of communication at a location at a future time based on a previous quality of communication at a predicted location of a communication node.

6. The method, as set fort in claim 1, further comprising the steps of (c) predicting quality of communication at a future time based on a predicted location of the communication nodes as a function of the speed and direction of travel of the communication nodes, and (d) selecting a path of communication having a desired predicted quality of communication.

7. The method, as set forth in claim 1, further comprising the steps of (c) predicting quality of communication at a future time based on a previous quality of communication at a predicted location of a communication node, and (d) selecting a path of communication having a desired predicted quality of communication.

8. A method for communicating between a first communication node and a second communication node in an area having a plurality of communication nodes, the method comprising the steps of:
   (a) generating, at selected time intervals, a propagation model of signals generated by selected communication nodes in the area based on an environmental map, the environmental map including the topography of terrain and structures in the area;
   (b) predicting quality of communication at a location at a future time based on the propagation model;
   (c) predicting quality of communication at a location at a future time based on a predicted location of the communication nodes as a function of the speed and direction of travel of the communication nodes;
   (d) predicting quality of communication at a location at a future time based on a previous quality of communication at a predicted location of a communication node; and
   (e) selecting a path of communication having a desired predicted quality of communication.

9. A method for communicating between a first communication node and a second communication node in an area having a plurality of communication nodes, the method comprising the steps of:
   (a) generating, at selected time intervals, a propagation model of signals generated by selected communication nodes in the area based on an environmental map, the environmental map including the topography of terrain and structures in the area; and
   (b) predicting quality of communication at a future time based on a predicted location of the communication nodes as a function of the speed and direction of travel of the communication nodes.

10. The method, as set forth in claim 9, further comprising the step of (c) predicting quality of communication at a future time based on a previous quality of communication at a predicted location of a communication node.

11. The method, as set forth in claim 9, further comprising the step of (c) selecting a path of communication having a desired predicted quality of communication.

12. The method, as set forth in claim 9, further comprising the steps of:
  (a) predicting quality of communication at a future time based on a predicted location of the communication nodes as a function of the speed and direction of travel of the communication nodes;
  (b) predicting quality of communication at a location at a future time based on a previous quality of communication at a predicted location of a communication node; and
  (if (c) selecting a path of communication having a desired predicted quality of communication.

13. A method for communicating between a first communication node and a second communication node in an area having a plurality of communication nodes, the method comprising the steps of:
  (a) generating, at selected time intervals, a propagation model of signals generated by selected communication nodes in the area based on an environmental map, the environmental map including the topography of terrain and structures in the area; and
  (b) predicting quality of communication at a future time based on a previous quality of communication at a predicted location of a communication node.

14. The method, as set forth in claim 13, further comprising the step of:
  (a) selecting a path of communication having a desired predicted quality of communication based on the propagation model.

15. An apparatus for communicating between a first communication node and a second communication node in an area having a plurality of communication nodes, the apparatus comprising:
  a data processor operable to continuously calculate a propagation model of signals generated by selected communication nodes in the area based on a continuously updated environmental map, the environmental map including the topography of terrain and structures in the area, and to predict a quality of communication at a location at a future time based on the propagation model.

16. The apparatus, as set forth in claim 15, wherein the data processor is further operable to predict quality of communication at a future time based on a predicted location of the communication nodes as a function of the speed and direction of travel of the communication nodes.

17. The apparatus, as set forth in claim 15, wherein the data processor is further operable to predict quality of communication at a location at a future time based on a previous quality of communication at a predicted location of a communication node.

18. The apparatus, as set forth in claim 15, wherein the data processor is further operable to select a path of communication having a desired predicted quality of communication.

19. The apparatus, as set forth in claim 15, wherein the data processor is further operable to predict quality of communication at a location at a future time based on a predicted location of the communication nodes as a function of the speed and direction of travel of the communication nodes, and a previous quality of communication at a predicted location of a communication node.

20. The apparatus, as set forth in claim 15, wherein the data processor is further operable to predict quality of communication at a location at a future time based on a predicted location of the communication nodes as a function of the speed and direction of travel of the communication nodes, and select a path of communication having a desired predicted quality of communication.

21. The apparatus, as set forth in claim 15, wherein the data processor is further operable to predict quality of communication at a future time based on a previous quality of communication at a predicted location of a communication node, and select a path of communication having a desired predicted quality of communication.

22. A method for communicating between a first communication node and a second communication node in an area having a plurality of communication nodes, the method comprising the steps of:
  continuously generating a propagation model of signals generated by selected communication nodes in the area based on an environmental map, the environmental map including the topography of the and structures in the area;
  predicting quality of communication at a location at a future time based on the propagation model, a predicted location of the communication nodes as a function of the speed and direction of travel of communication at a predicted location of a communication node; and
  selecting a path of communication among the communication nodes that is best available for a predicted quality of communication.

23. The method as set forth in claim 22, further comprising the step of:
  modifying a packet of data being communicated from a first communication node to a second communication node to indicate the selected path of communication.

24. The method, as set forth in claim 22, wherein one communication node is a wide area network, and another communication node is a local area network.

25. The method for communicating between a first communication node and a second communication node in an area having a plurality of communication nodes, the method comprising the steps of:
  continuously calculate a propagation model of signals generated by selected communication nodes in the area based on a continuously updated environmental map, the environmental map including the topography of terrain and structures in the area; and
  predicting a quality of communication at a location at a future time based on the propagation model.

26. An apparatus for communicating between a first communication node and a second communication node in an area having a plurality of communication nodes, the apparatus comprising a data processor operable to continuously generate a propagation model of signals generated by selected communication nodes in the area based on an environmental map, the environmental map including the topography of terrain and structures in the area, to predict a quality of communication at a location at a fixture time based on the propagation model, a predicted location of the communication nodes as a function of the speed and direction of travel of communication at a predicted location of a communication node, to select a path of communication among the communication nodes that is best available for the predicted quality of communication, and to modify a packet of data being communicated from a first communication node to a second communication node to indicate the selected path of communication.

* * * * *

UNITED STATES PATENT AND TRADEMARK OFFICE
CERTIFICATE OF CORRECTION

PATENT NO.   : 6,625,135 B1
DATED        : September 23, 2003
INVENTOR(S)  : David B. Johnson et al.

It is certified that error appears in the above-identified patent and that said Letters Patent is hereby corrected as shown below:

Column 1,
Line 52, after the phrase "it is" delete "ad";

Column 14,
Lines 47, 49 and 60, delete "GUT" and replace with -- GUI --.

Signed and Sealed this

Sixth Day of January, 2004

JAMES E. ROGAN
*Director of the United States Patent and Trademark Office*